United States Patent
Sanisetty et al.

(10) Patent No.: US 12,267,119 B2
(45) Date of Patent: Apr. 1, 2025

(54) ENHANCING DETECTION IN WIRELESS COMMUNICATION SYSTEMS

(71) Applicant: Rakuten Symphony, Inc., Tokyo (JP)

(72) Inventors: Suman Venkata Sanisetty, Bangalore (IN); Venkatesh Hampasandra Muralidhara, Bangalore (IN)

(73) Assignee: RAKUTEN SYMPHONY, INC., Tokyo (JP)

(*) Notice: Subject to any disclaimer, the term of this patent is extended or adjusted under 35 U.S.C. 154(b) by 0 days.

(21) Appl. No.: 17/800,644

(22) PCT Filed: Jul. 15, 2022

(86) PCT No.: PCT/US2022/037319
§ 371 (c)(1),
(2) Date: Jan. 18, 2024

(87) PCT Pub. No.: WO2024/015078
PCT Pub. Date: Jan. 18, 2024

(65) Prior Publication Data
US 2024/0223290 A1    Jul. 4, 2024

(51) Int. Cl.
*H04W 24/08*    (2009.01)
*H04B 17/336*    (2015.01)

(52) U.S. Cl.
CPC .......... *H04B 17/336* (2015.01); *H04W 24/08* (2013.01)

(58) Field of Classification Search
CPC ............. H04W 24/08; H04W 74/0833; H04W 56/0045; H04W 74/083; H04W 56/004; H04B 17/336; H04B 17/33; H04L 27/2657; H04L 27/2647; H04L 25/0202
See application file for complete search history.

(56) References Cited

U.S. PATENT DOCUMENTS 7,315,566 B2    1/2008    Tanno et al.
8,045,636 B1    10/2011    Lee et al.
8,483,329 B2    7/2013    Ghosh
(Continued)

FOREIGN PATENT DOCUMENTS

WO    WO-2005022681 A2    3/2005
WO    WO-2007117525 A2    10/2007
WO    WO-2018009381 A1    1/2018

OTHER PUBLICATIONS

International Search Report and Written Opinion for Intl. Pat. App. No. PCT/US22/37319 dated Oct. 4, 2022.
(Continued)

*Primary Examiner* — Wei Zhao
(74) *Attorney, Agent, or Firm* — Sughrue Mion, PLLC

(57) ABSTRACT

Methods, systems, and computer program products are provided for enhancing detection in wireless communication systems. In some implementations, a signal received by one or more antennas on a communication channel can be processed. The signal can include a frame having a plurality of symbols, and the plurality of symbols can include one or more symbol groups. A signal to interference noise power ratio (SINR) associated with the received signal can be determined using a signal power determined based on subcarrier resource allocation and noise power determined based on one or more reserved subcarrier allocation associated with the received signal.

20 Claims, 14 Drawing Sheets

(56) References Cited

U.S. PATENT DOCUMENTS

| | | | | |
|---|---|---|---|---|
| 8,626,227 | B2* | 1/2014 | Zhu | ............... H04L 5/006 |
| | | | | 370/252 |
| 9,332,469 | B2 | 5/2016 | Davydov et al. | |
| 9,729,295 | B2* | 8/2017 | Zhang | ............... H04L 1/1861 |
| 11,356,156 | B2 | 6/2022 | Murakami et al. | |
| 2005/0053167 | A1 | 3/2005 | Li et al. | |
| 2021/0029607 | A1* | 1/2021 | Zhou | ............... H04W 36/08 |
| 2021/0126726 | A1 | 4/2021 | Parkvall et al. | |

OTHER PUBLICATIONS

International Search Report and Written Opinion for Intl. Pat. App. No. PCT/US22/37316 dated Oct. 6, 2022.

3GPP TS 36.211 V10.4.0, 3rd Generation Partnership Project; Technical Specification Group Radio Access Network; Evolved Universal Terrestrial Radio Access (E-UTRA); Physical Channels and Modulation, Dec. 2011.

Cho et al., "Determination of Optimum Threshold Values for NPRACH Preamble Detection in NB-IoT Systems," 2018 Tenth International Conference on Ubiquitous and Future Networks (ICUFN) Jul. 3-6, 2018.

Lin et al., "Random Access Preamble Design and Detection for 3GPP Narrowband IoT Systems," IEEE Wireless Communications, Sep. 15, 2016, pp. 640-643.

* cited by examiner

ENHANCING DETECTION IN WIRELESS COMMUNICATION SYSTEMS

CROSS-REFERENCE TO RELATED APPLICATIONS

The present application claims priority to and is the 35 U.S.C. 371 United States National Phase application based on International Patent Application No. PCT/US2022/037319, filed on Jul. 15, 2022, entitled "ENHANCING DETECTION IN WIRELESS COMMUNICATION SYSTEMS," which is hereby incorporated by reference in its entirety.

TECHNICAL FIELD

In some implementations, the current subject matter relates to telecommunications systems, and in particular, to enhancing detection in wireless communication systems, such as, for example, long term evolution communications systems, 5G New Radio ("NR") communications systems, and any other systems.

BACKGROUND

In today's world, cellular networks provide on-demand communications capabilities to individuals and business entities. Typically, a cellular network is a wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide improved service within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if the mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. A 5G standard is currently being developed and deployed. 3GPP cellular technologies like LTE and 5G NR are evolutions of earlier generation 3GPP technologies like the GSM/EDGE and UMTS/HSPA ("Universal Mobile Telecommunications System"/"High Speed Packet Access") digital cellular technologies and allows for increasing capacity and speed by using a different radio interface together with core network improvements.

Cellular networks can be divided into radio access networks and core networks. The radio access network ("RAN") can include network functions that can handle radio layer communications processing. The core network can include network functions that can handle higher layer communications, e.g., internet protocol ("IP"), transport layer and applications layer. In some cases, the RAN functions can be split into baseband unit functions and the radio unit functions, where a radio unit connected to a baseband unit via a fronthaul network, for example, can be responsible for lower layer processing of a radio physical layer while a baseband unit can be responsible for the higher layer radio protocols, e.g., medium access control ("MAC"), radio link control ("RLC"), etc.

Mobile devices are used for receiving and transmitting of various types of data, such as, voice data (e.g., telephone calls), emails, text messages, Internet browsing, video data (e.g., videos, video calling, augmented/virtual reality, etc.), audio data (e.g., streaming of songs), etc. Mobile devices located in extreme channel conditions may have difficulty being detected to allow the mobile device to be connected to a base station to allow for the receipt and transmission data. These extreme channel conditions may include mobile devices located deep underground (e.g., in a sub-basement level of a building, etc.) or mobile devices located far away from a cell site or a transmitting tower. Thus, there is a need to improve quality of detection in extreme channel conditions.

SUMMARY

In some implementations, the current subject matter relates to a computer implemented method for enhancing detection in wireless communication systems. The method can include processing, using at least one processor, a signal received by one or more antennas. The signal can include a frame having a plurality of symbols, on a communication channel, and the plurality of symbols cam include one or more symbol groups. The method can also include determining, using the at least one processor, a signal to interference noise power ratio associated with the received signal using a signal power determined based on subcarrier resource allocation and noise power determined based on one or more reserved subcarrier allocation associated with the received signal.

In some implementations, the current subject matter can include one or more of the following optional features. In some implementations, determining of the signal power can be based on a correlation of subcarrier resource allocations associated with one or more adjacent symbol groups and one or more non-adjacent symbol groups in the one or more symbol groups.

In some implementations, the noise power can be determined based on the one or more reserved subcarrier allocation associated with a narrow band internet of things ("NB-IoT") region of the received signal.

In some implementations, the noise power can be determined based on the one or more reserved subcarrier allocation being adjacent to a NB-IoT region of the received signal.

In some implementations, the determining can be based on at least one of a carrier frequency offset and a timing advance offset associated with the received signal.

In some implementations, the signal can include one or more NB-IoT physical random access channel ("NPRACH") signals. Further, in some implementations, the method can further include repeating the determining of the signal to interference noise power ratio in accordance with the received one or more NPRACH signals. Yet further, in some implementations, the method can further include detecting one or more preambles associated with the received signal in accordance with the repeating. Still further, in some implementations, one or more preambles can be detected in accordance with one or more hopping sequences associated with the one or more symbol groups, and/or the detecting can be based on a comparison of the determined signal to interference noise power ratio to one or more signal to interference noise power ratio thresholds.

In some implementations, the signal can not include any NPRACH signals. Further, in some implementations, the method can further include repeating the determining of the signal to interference noise power ratio in accordance with the received signal without any NPRACH signals. Yet further, in some implementations, no preambles associated with the received signal can be detected based on the repeating.

In some implementations, the signal can be received from at least one of the following: a user equipment, a base station, and any combination thereof.

In some implementations, at least one of the processing, and the determining can be performed by a base station having at least one processor communicatively coupled to at least one memory, and the base station can further include a radio transmitter and a radio receiver. Yet further, in some implementations, the base station cam include at least one of the following: an eNodeB base station, a gNodeB base station, and any combination thereof. Still further, in some implementations, the communication channel can include an uplink communication channel. Even further, in some implementations, the uplink communication channel can be established with the base station, or the uplink communication channel can be established between the base station and at least one user equipment.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

DETAILED DESCRIPTION

The current subject matter can provide for systems and methods that can be implemented in wireless communications systems. Such systems can include various wireless communications systems, including 5G New Radio communications systems, long term evolution communication systems, etc.

In some implementations, the current subject matter relates to enhancing detection in wireless communication systems. In some implementations, enhancing detection in wireless communication systems can include performing signal to noise interference power ratio (SINR) estimation. Performing SINR estimation can include processing a signal received by one or more antennas on a communication channel. The signal can include a frame having a plurality of symbols, and the plurality of symbols can include one or more symbol groups. An SINR associated with the received signal can be determined using a signal power determined based on subcarrier resource allocation and noise power determined based on one or more reserved subcarrier allocation associated with the received signal.

One or more aspects of the current subject matter can be incorporated into transmitter and/or receiver components of base stations (e.g., gNodeBs, eNodeBs, etc.) in such communications systems. The following is a general discussion of long-term evolution communications systems and 5G New Radio communication systems.

I. Long Term Evolution Communications System

FIGS. 1a-c and 2 illustrate an exemplary conventional long-term evolution ("LTE") communication system 100 along with its various components. An LTE system or a 4G LTE, as it is commercially known, is governed by a standard for wireless communication of high-speed data for mobile telephones and data terminals. The standard is an evolution of the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard was developed by the 3GPP ("3rd Generation Partnership Project").

Figure 1A:
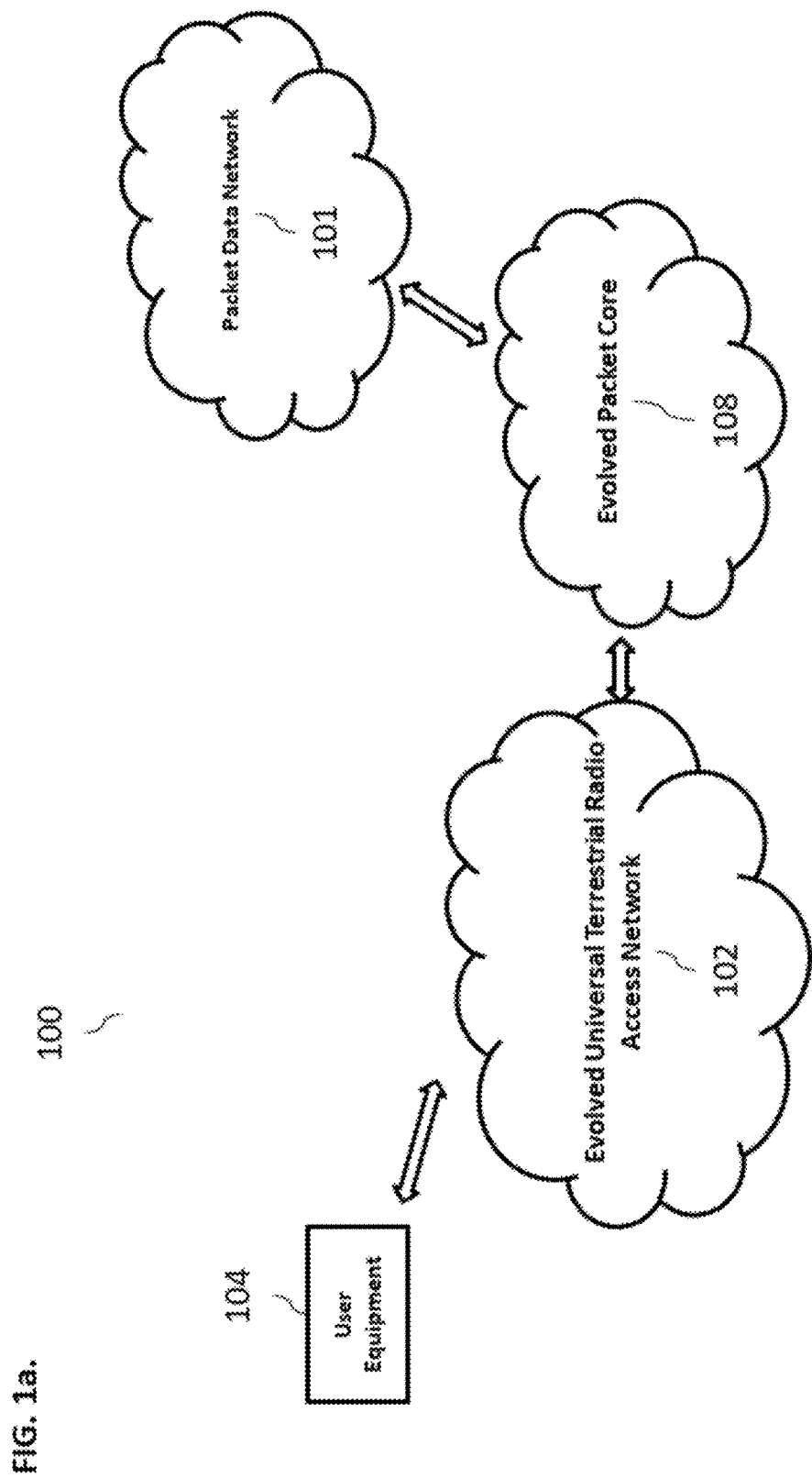
FIG. 1a illustrates an exemplary conventional long term evolution ("LTE") communications system.
Figure 1B:
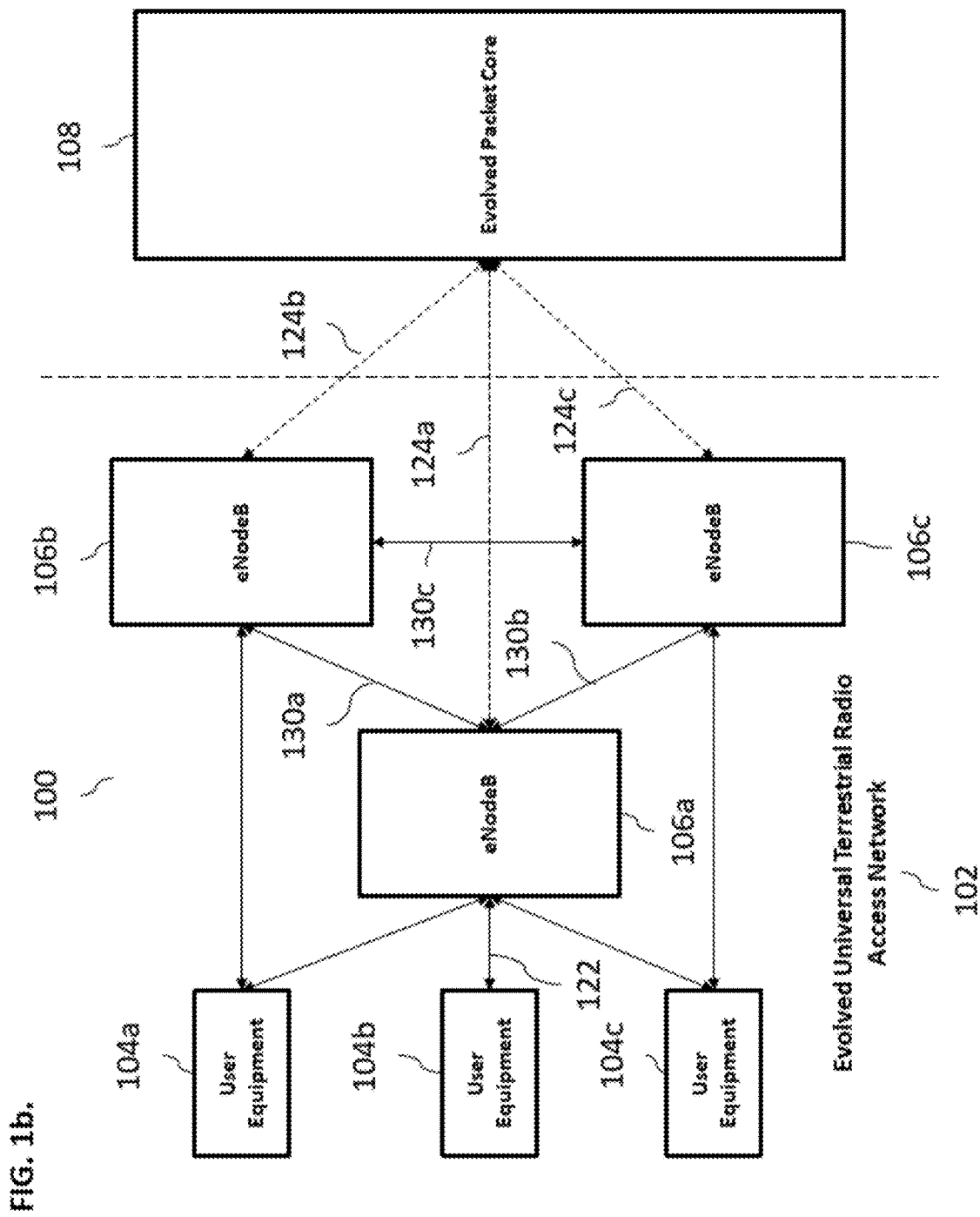

As shown in FIG. 1a, the system 100 can include an evolved universal terrestrial radio access network ("EUTRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (106a, 106b, 106c) (as shown in FIG. 1b) that provide communication capabilities to a plurality of user equipment 104 (104a, 104b, 104c). The user equipment 104 can be a mobile telephone, a smartphone, a tablet, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
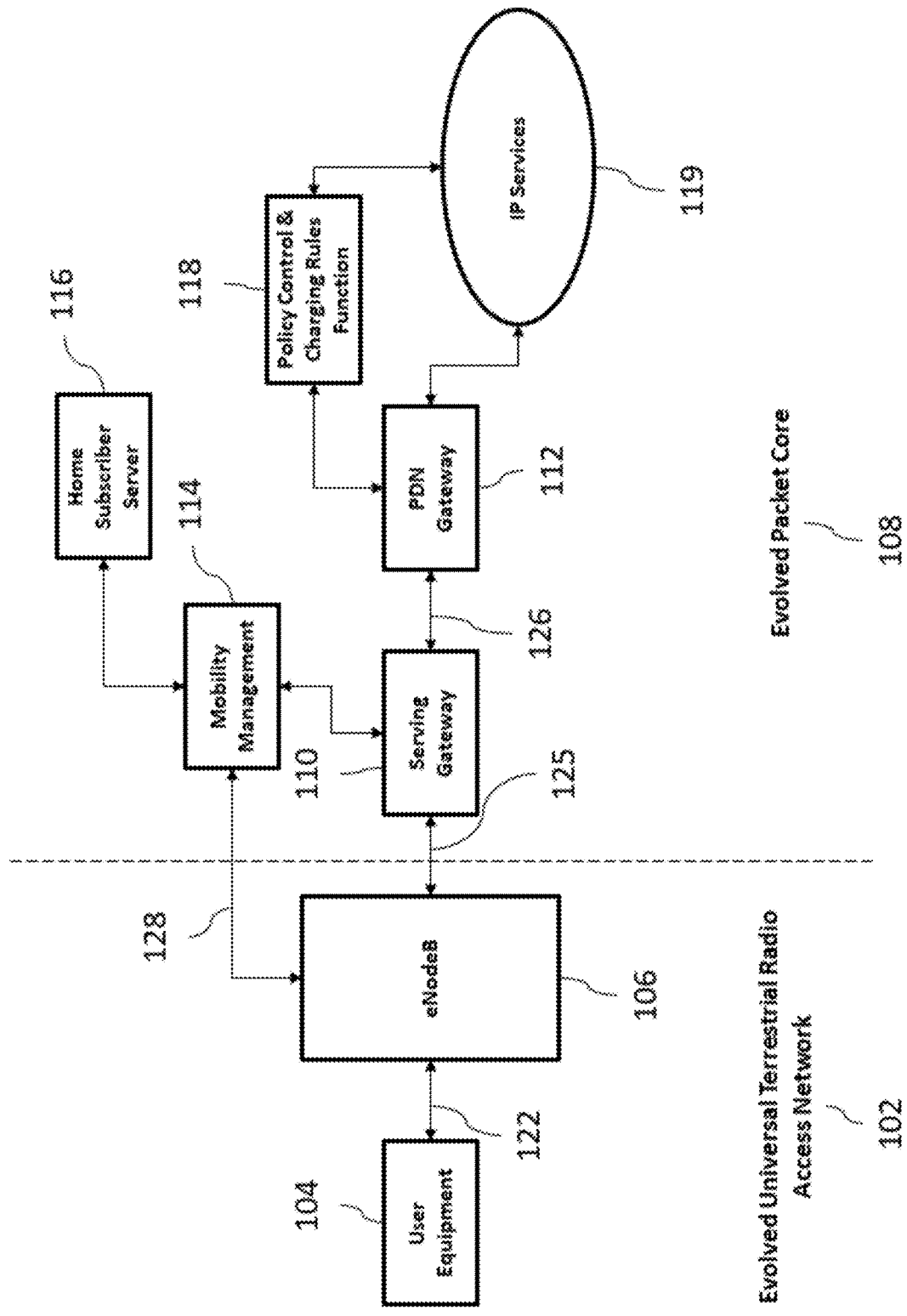

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMEs, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130 (130a, 130b, 130c). As shown in FIG. 1b, X2 interface 130a provides interconnection between eNodeB 106a and eNodeB 106b; X2 interface 130b provides interconnection between eNodeB 106a and eNodeB 106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124 (124a, 124b, 124c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to inter-work with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QOS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1a).

Figure 1D:
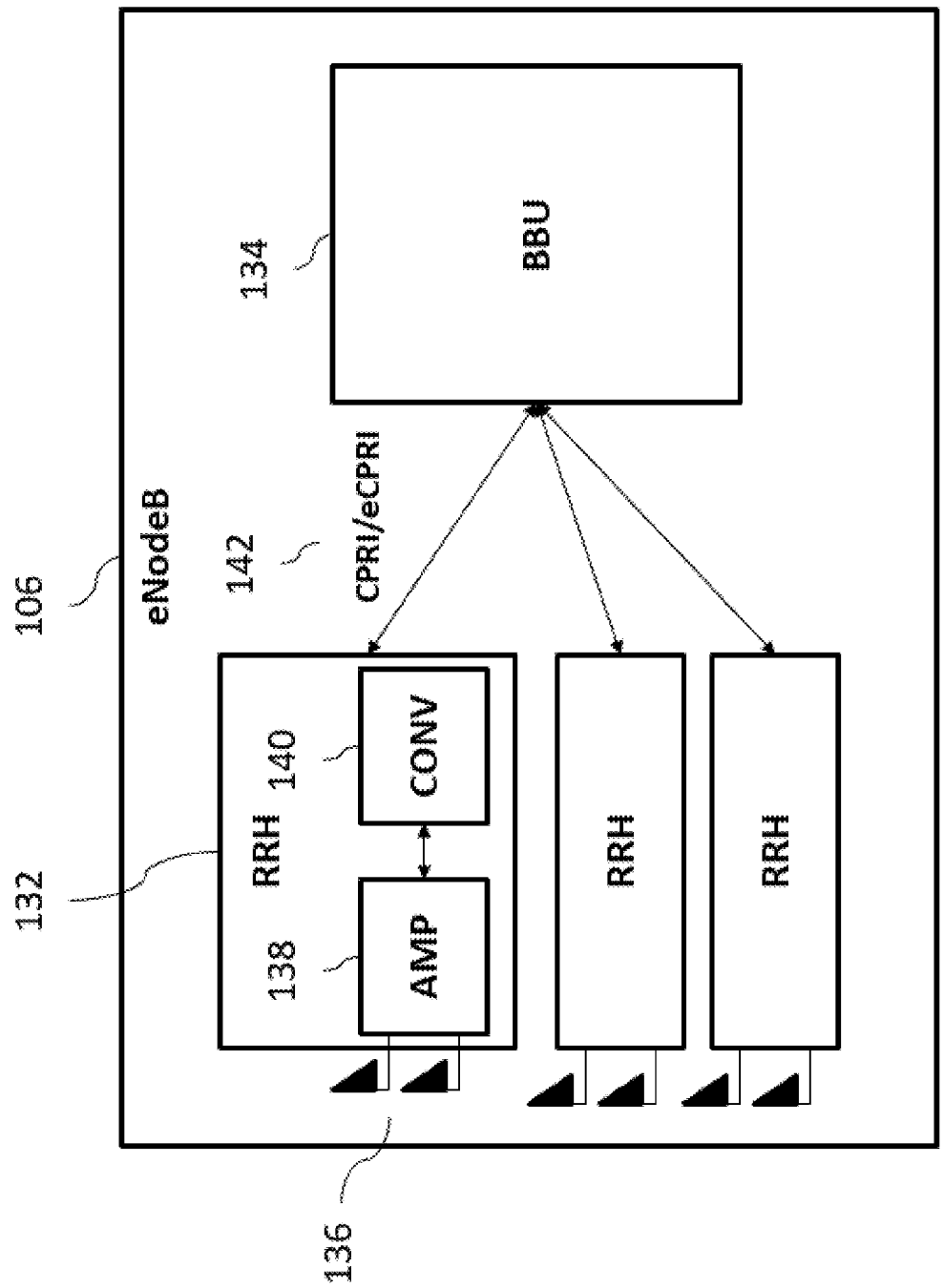

FIG. 1d illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI")/enhanced CPRI ("eCPRI") 142 standard specification either using RRH specific custom control and user plane framing methods or using open radio access network ("O-RAN") Alliance compliant Control and User plane framing methods. The operation of the eNodeB 106 can be characterized using the following standard parameters (and specifications): radio frequency band (Band4, Band9, Band17, etc.), bandwidth (5, 10, 15, 20 MHZ), access scheme (downlink: OFDMA; uplink: SC-OFDMA), antenna technology (Single user and multi user MIMO; Uplink: Single user and multi user MIMO), number of sectors (6 maximum), maximum transmission rate (downlink: 150) Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1d) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1d). Conversely, the RF signals that are received from user equipment 104 are amplified (using AMP 138) and converted (using CONV 140) to digital baseband signals for transmission to the BBU 134.

Figure 2:
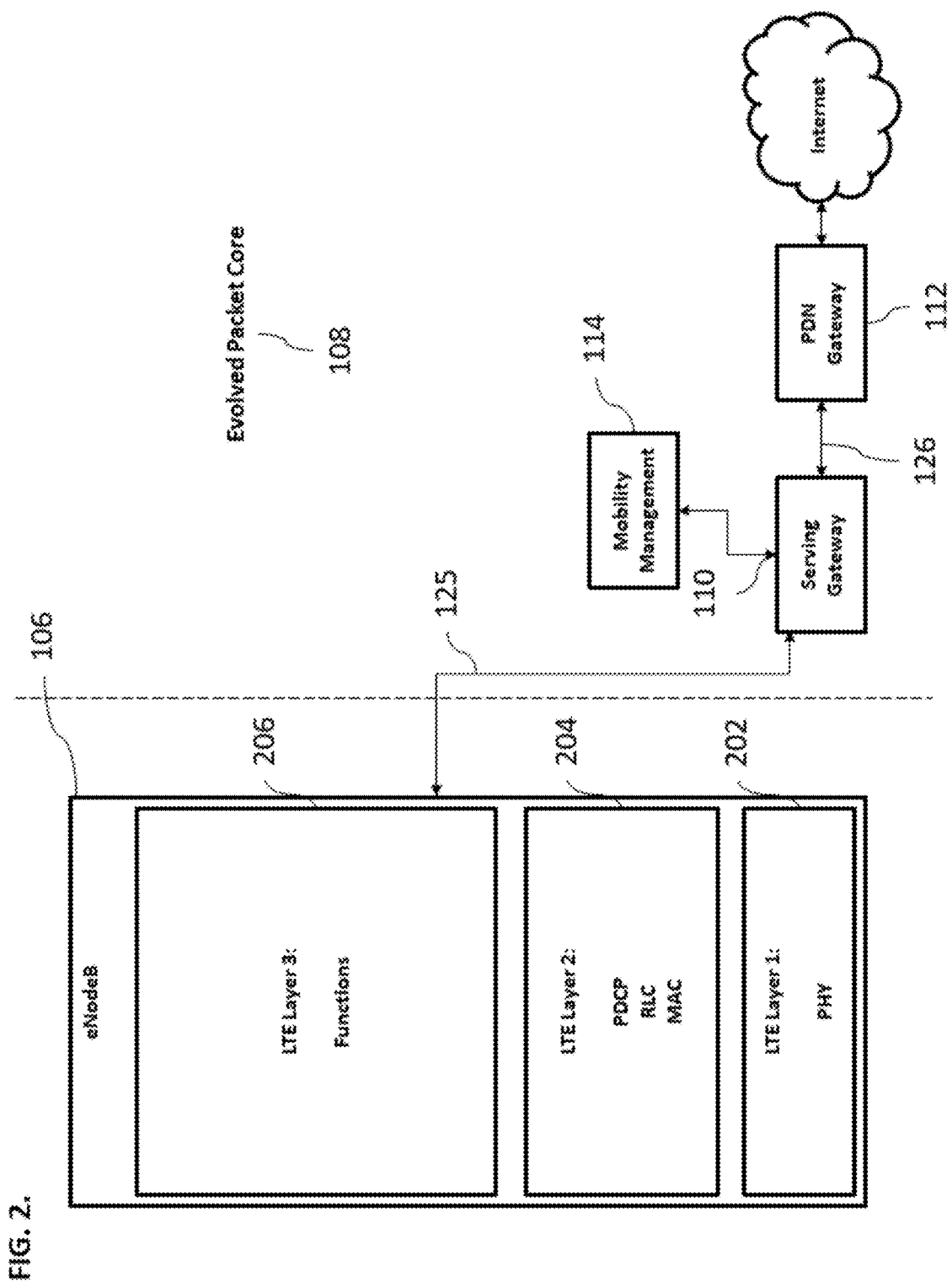
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 includes a physical layer ("PHY"). The LTE layer 2 includes a medium access control ("MAC"), a radio link control ("RLC"), and a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1d, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMEs and S-GWs. The eNodeB 106 selects an MME from a group of MMEs so the load can be shared by multiple MMEs to avoid congestion.

II. 5G NR Wireless Communications Networks

In some implementations, the current subject matter relates to a 5G new radio ("NR") communications system. The 5G NR is a next telecommunications standard beyond the 4G/IMT-Advanced standards. 5G networks offer at higher capacity than current 4G, allow higher number of mobile broadband users per area unit, and allow consumption of higher and/or unlimited data quantities in gigabyte per month and user. This can allow users to stream high-definition media many hours per day using mobile devices, even when it is not possible to do so with Wi-Fi networks. 5G networks have an improved support of device-to-device communication, lower cost, lower latency than 4G equipment and lower battery consumption, etc. Such networks have data rates of tens of megabits per second for a large number of users, data rates of 100 Mb/s for metropolitan areas, 1 Gb/s simultaneously to users within a confined area (e.g., office floor), a large number of simultaneous connections for wireless sensor networks, an enhanced spectral efficiency, improved coverage, enhanced signaling efficiency, 1-10 ms latency, reduced latency compared to existing systems.

Figure 3:
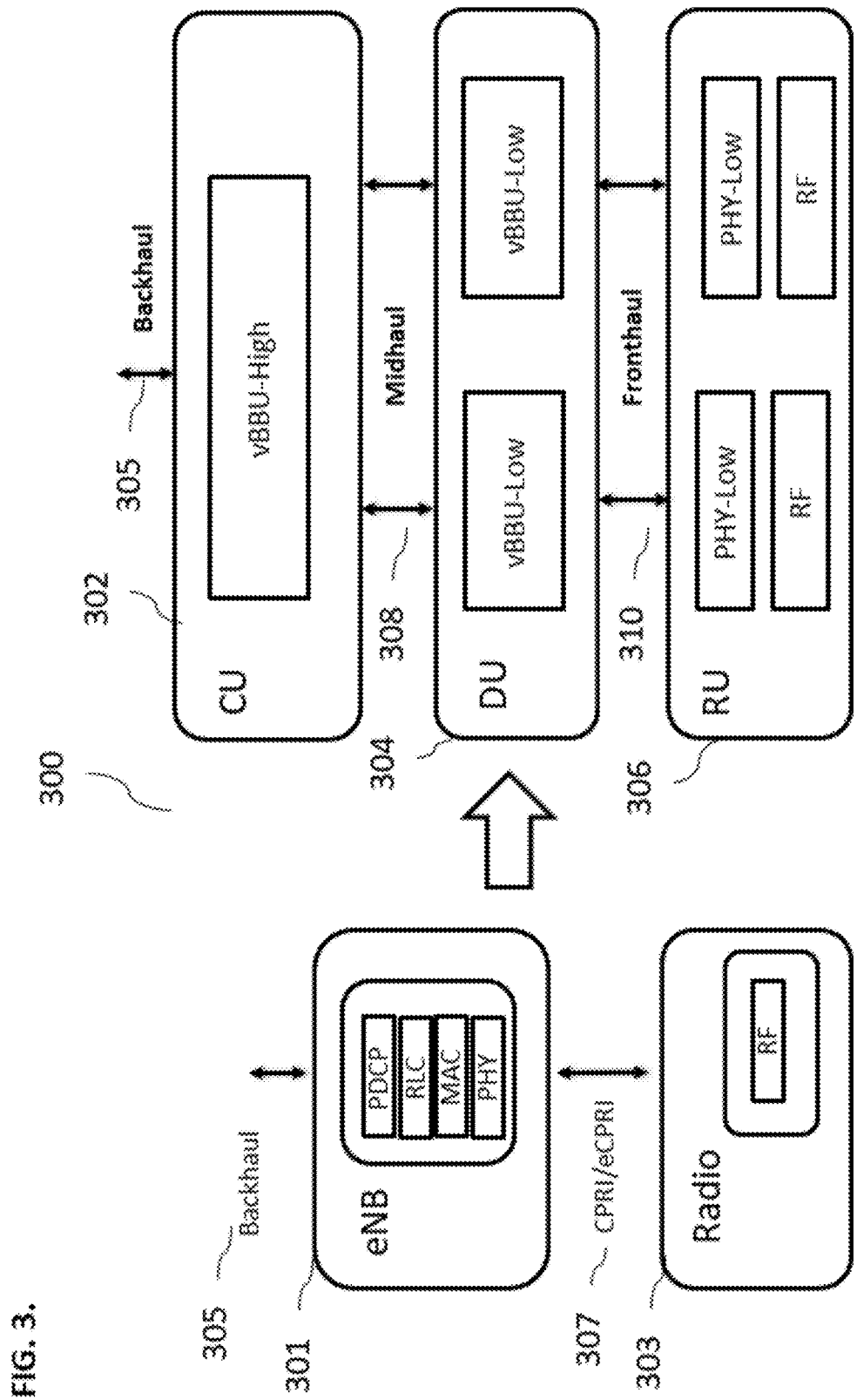
FIG. 3 illustrates an exemplary virtual radio access network, according to some implementations of the current subject matter.

FIG. 3 illustrates an exemplary virtual radio access network 300. The network 300 can provide communications between various components, including a base station (e.g., eNodeB, gNodeB) 301, a radio equipment 307, a centralized unit 302, a digital unit 304, and a radio device 306. The components in the system 300 can be communicatively coupled to a core using a backhaul link 305. A centralized unit ("CU") 302 can be communicatively coupled to a distributed unit ("DU") 304 using a midhaul connection 308. The radio frequency ("RU") components 306 can be communicatively coupled to the DU 304 using a fronthaul connection 310.

In some implementations, the CU 302 can provide intelligent communication capabilities to one or more DUs 308. The units 302, 304 can include one or more base stations, macro base stations, micro base stations, remote radio heads, etc. and/or any combination thereof.

In lower layer split ("LLS") architecture environment, a CPRI bandwidth requirement for NR can be 100s of Gb/s. CPRI compression can be implemented in the DU and RU (as shown in FIG. 3). In 5G communications systems, compressed CPRI over Ethernet frame is referred to as eCPRI and is the recommended fronthaul network. The architecture can allow for standardization of fronthaul/midhaul, which can include a higher layer split (e.g., Option 2 or Option 3-1 (Upper/Lower RLC split architecture)) and fronthaul with L1-split architecture (Option 7).

In some implementations, the lower layer-split architecture (e.g., Option 7) can include a receiver in the uplink, joint processing across multiple transmission points (TPs) for both DL/UL, and transport bandwidth and latency requirements for ease of deployment. Further, the current subject matter's lower layer-split architecture can include a split between cell-level and user-level processing, which can include cell-level processing in remote unit ("RU") and user-level processing in DU. Further, using the current subject matter's lower layer split architecture, frequency-domain samples can be transported via Ethernet fronthaul, where the frequency-domain samples can be compressed for reduced fronthaul bandwidth.

Figure 4:
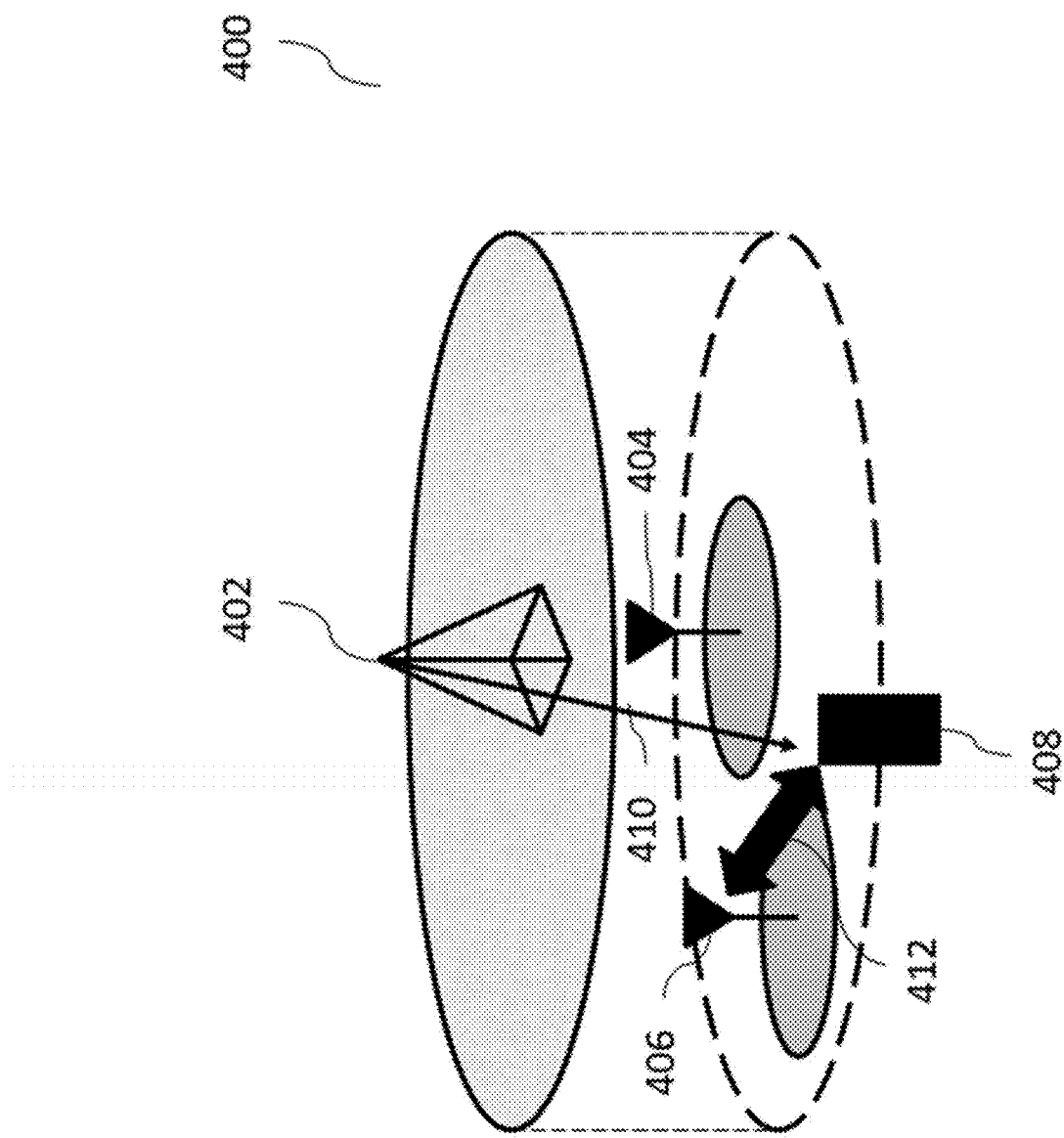
FIG. 4 illustrates an exemplary 3GPP split architecture to provide its users with use of higher frequency bands.

FIG. 4 illustrates an exemplary communications system 400 that can implement a 5G technology and can provide its users with use of higher frequency bands (e.g., greater than 10 GHZ). The system 400 can include a macro cell 402 and small cells 404, 406.

A mobile device 408 can be configured to communicate with one or more of the small cells 404, 406. The system 400 can allow splitting of control planes (C-plane) and user planes (U-plane) between the macro cell 402 and small cells 404, 406, where the C-plane and U-plane are utilizing different frequency bands. In particular, the small cells 404, 406 can be configured to utilize higher frequency bands when communicating with the mobile device 408. The macro cell 402 can utilize existing cellular bands for C-plane communications. The mobile device 408 can be communicatively coupled via U-plane 412, where the small cell (e.g., small cell 406) can provide higher data rate and more flexible/cost/energy efficient operations. The macro cell 402, via C-plane 410, can maintain good connectivity and mobility. Further, in some cases, LTE and NR can be transmitted on the same frequency.

Figure 5A:
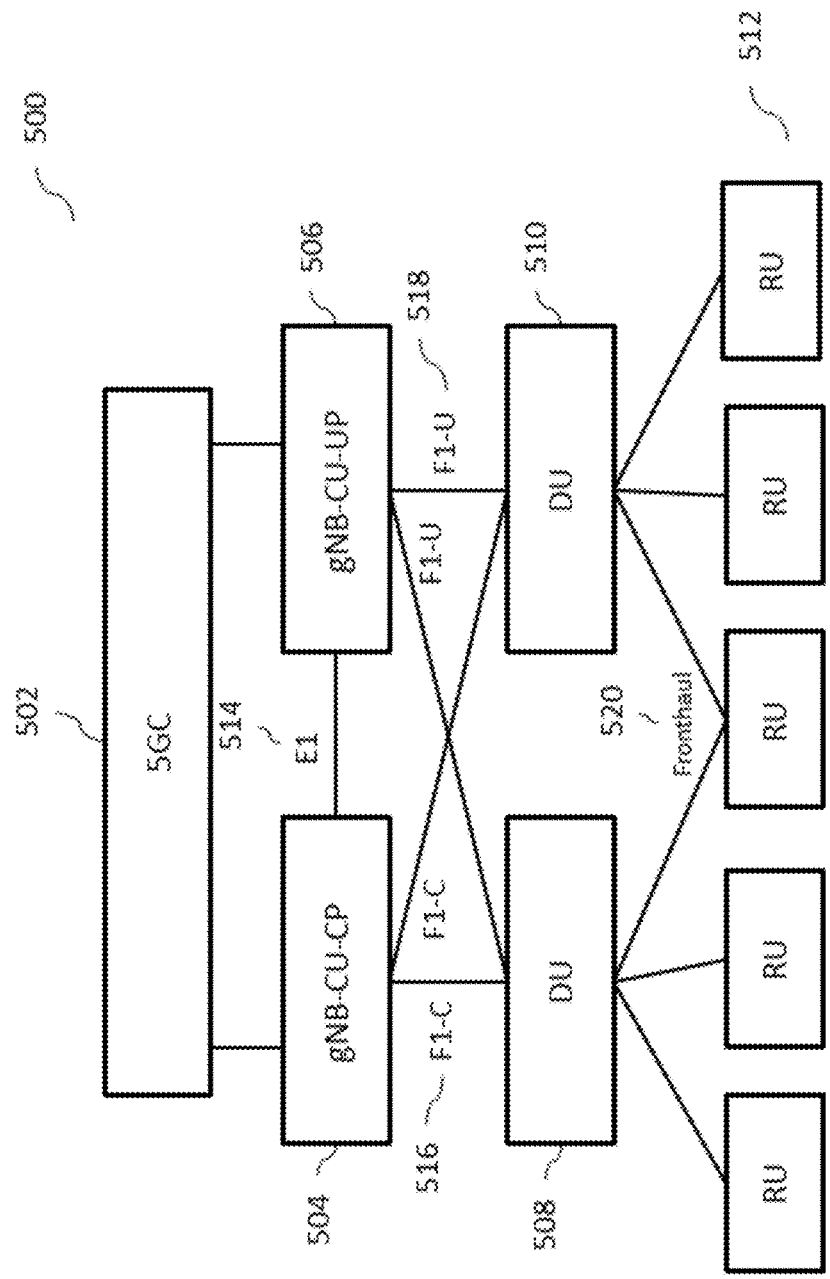
FIG. 5a illustrates an exemplary 5G wireless communication system.

FIG. 5a illustrates an exemplary 5G wireless communication system 500, according to some implementations of the current subject matter. The system 500 can be configured to have a lower layer split architecture in accordance with Option 7-2. The system 500 can include a core network 502 (e.g., 5G Core) and one or more gNodeBs (or gNBs), where the gNBs can have a centralized unit gNB-CU. The gNB-CU can be logically split into control plane portion, gNB-CU-CP, 504 and one or more user plane portions, gNB-CU-UP, 506. The control plane portion 504 and the user plane portion 506 can be configured to be communicatively coupled using an E1 communication interface 514 (as specified in the 3GPP Standard). The control plane portion 504 can be configured to be responsible for execution of the RRC and PDCP protocols of the radio stack.

The control plane and user plane portions 504, 506 of the centralized unit of the gNB can be configured to be communicatively coupled to one or more distributed units (DU) 508, 510, in accordance with the higher layer split ("HLS") architecture. The distributed units 508, 510 can be configured to execute RLC, MAC, and upper part of PHY layers protocols of the radio stack. The control plane portion 504 can be configured to be communicatively coupled to the distributed units 508, 510 using F1-C communication interfaces 516, and the user plane portions 506 can be configured to be communicatively coupled to the distributed units 508, 510 using F1-U communication interfaces 518. The distributed units 508, 510 can be coupled to one or more remote radio units (RU) 512 via a fronthaul network 520 (which may include one or switches, links, etc.), which in turn communicate with one or more user equipments (not shown in FIG. 5a). The remote radio units 512 can be configured to execute a lower part of the PHY layer protocols as well as provide antenna capabilities to the remote units for communication with user equipments (similar to the discussion above in connection with FIGS. 1a-2).

Figure 5B:
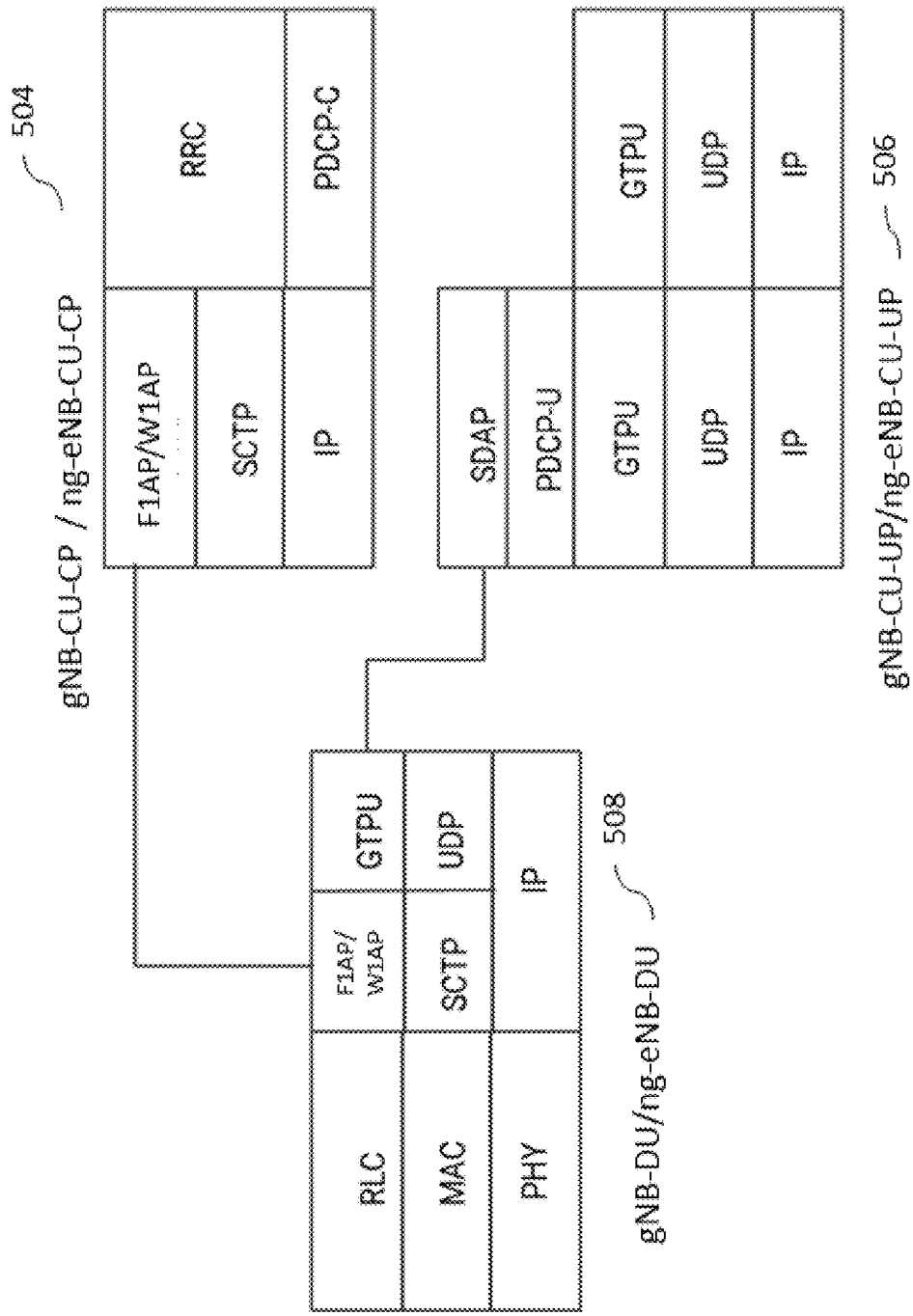
FIG. 5b illustrates an exemplary layer architecture of the split gNodeB ("gNB") and/or a split next generation evolved node B (e.g., next generation eNB that may be connected to 5G Core ("5GC"))

FIG. 5b illustrates an exemplary layer architecture of the split gNB. The architecture can be implemented in the communications system 500 shown in FIG. 5a, which can be configured as a virtualized disaggregated radio access network (RAN) architecture, whereby layers L1, L2, L3 and radio processing can be virtualized and disaggregated in the centralized unit(s), distributed unit(s) and radio unit(s). As shown in FIG. 5b, the gNB-DU 508 can be communicatively coupled to the gNB-CU-CP control plane portion 504 (also shown in FIG. 5a) and gNB-CU-UP user plane portion 506. Each of components 504, 506, 508 can be configured to include one or more layers.

The gNB-DU 508 can include RLC, MAC, and PHY layers as well as various communications sublayers. These can include an F1 application protocol ("F1-AP") sublayer, a GPRS tunneling protocol ("GTPU") sublayer, a stream control transmission protocol ("SCTP") sublayer, a user datagram protocol ("UDP") sublayer and an internet protocol (IP) sublayer. As stated above, the distributed unit 508 may be communicatively coupled to the control plane portion 504 of the centralized unit, which may also include F1-AP, SCTP, and IP sublayers as well as radio resource control, and PDCP-control ("PDCP-C") sublayers. Moreover, the distributed unit 508 may also be communicatively coupled to the user plane portion 506 of the centralized unit of the gNB. The user plane portion 506 may include service data adaptation protocol ("SDAP"), PDCP-user ("PDCP-U"), GTPU, UDP, and IP sublayers.

Figure 5C:
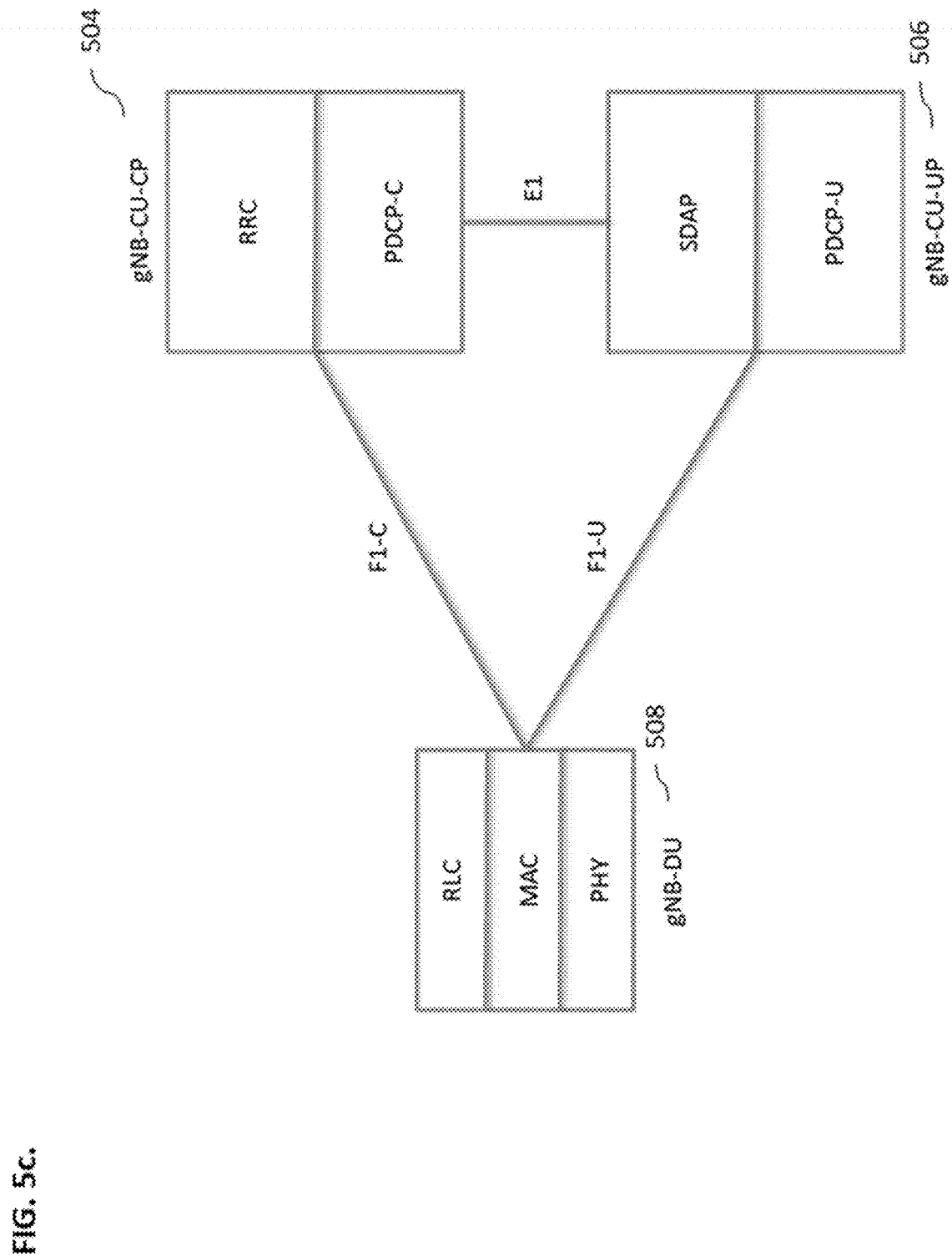
FIG. 5c illustrates an exemplary functional split in the gNB architecture shown in FIGS. 5a-b.

FIG. 5*c* illustrates an exemplary functional split in the gNB architecture shown in FIGS. 5*a-b*. As shown in FIG. 5*c*, the gNB-DU 508 may be communicatively coupled to the gNB-CU-CP 504 and GNB-CU-UP 506 using an F1-C communication interface. The gNB-CU-CP 504 and GNB-CU-UP 506 may be communicatively coupled using an E1 communication interface. The higher part of the PHY layer (or Layer 1) may be executed by the gNB-DU 508, whereas the lower parts of the PHY layer may be executed by the RUs (not shown in FIG. 5*c*). As shown in FIG. 5*c*, the RRC and PDCP-C portions may be executed by the control plane portion 504, and the SDAP and PDCP-U portions may be executed by the user plane portion 506.

Some of the functions of the PHY layer in 5G communications network can include error detection on the transport channel and indication to higher layers, forward error correction ("FEC") encoding/decoding of the transport channel, hybrid ARQ soft-combining, rate matching of the coded transport channel to physical channels, mapping of the coded transport channel onto physical channels, power weighting of physical channels, modulation and demodulation of physical channels, frequency and time synchronization, radio characteristics measurements and indication to higher layers, MIMO antenna processing, digital and analog beamforming, and RF processing, as well as other functions.

The MAC sublayer of Layer 2 can perform beam management, random access procedure, mapping between logical channels and transport channels, concatenation of multiple MAC service data units ("SDUs") belonging to one logical channel into transport block (TB), multiplexing/demultiplexing of SDUs belonging to logical channels into/from TBs delivered to/from the physical layer on transport channels, scheduling information reporting, error correction through hybrid automatic repeat request ("HARQ"), priority handling between logical channels of one UE (user equipment), priority handling between UEs by means of dynamic scheduling, transport format selection, and other functions. The RLC sublayer's functions can include transfer of upper layer packet data units (PDUs), error correction through ARQ, reordering of data PDUs, duplicate and protocol error detection, re-establishment, etc. The PDCP sublayer can be responsible for transfer of user data, various functions during re-establishment procedures, retransmission of SDUs, SDU discard in the uplink, transfer of control plane data, and others.

Layer 3's RRC sublayer can perform broadcasting of system information to NAS and AS, establishment, maintenance and release of RRC connection, security, establishment, configuration, maintenance and release of point-point radio bearers, mobility functions, reporting, and other functions.

III. Enhancing Detection in Wireless Communication Systems

In some implementations, the current subject matter relates to an ability to enhance communications, including enhancement of detection of signals, in wireless communications systems. As stated, such exemplary communications systems may include, but are not limited, to 4G LTE communications systems, 5G new radio ("NR") communications system, and/or any other communications systems.

Figure 6:
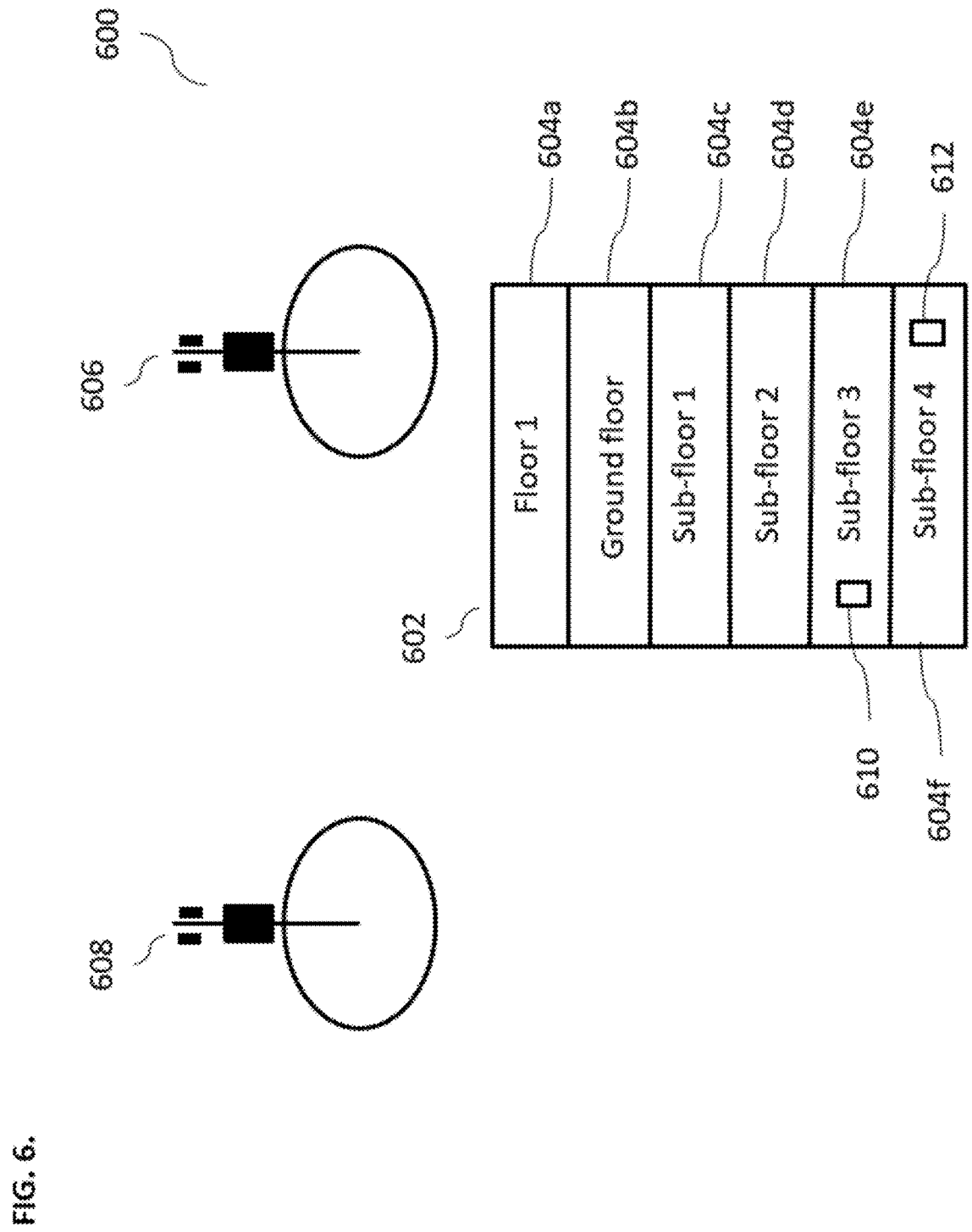
FIG. 6 illustrates an exemplary system for enhancing detection in wireless communication systems, according to some implementations of the current subject matter.

FIG. 6 illustrates an exemplary system 600 for performing enhancement of detection of signals in wireless communications systems, according to some implementations of the current subject matter. The system 600 is illustrated with respect to an underground environment where one or more user equipments are located deep underground at a sub-basement level of a building. As can be understood, the current subject matter system may be implemented in any other type of environment to provide an enhanced detection of signals, such as an underground environment where one or more user equipments are located deep underground in a mine, etc., in a rural or other environment where one or more user equipments are located far away from a cell site or a transmitting tower, or in an environment where a high number of UEs are simultaneously accessing (or attempting to access) the network.

As shown in FIG. 6, the system 600 can implemented in an extreme channel condition that can include, for example, a building 602 having a plurality of floors 604*a*, 604*b* 604*c*, 604*d*, 604*e*, 604*f*, one or more communication nodes 606, 608 (e.g., eNodeBs, etc.), and one or more user equipments 610, 612 that may be located inside the building 602 and may be attempting to communicate with one or more of the communication nodes 606, 608. In this illustrated implementation, the first user equipment ("UE") 610 is located underground on a third sub-floor 604*e* (e.g., third basement level) of the building 602, and the second UE 612 is located underground on a fourth sub-floor 604*f* (e.g., fourth basement level) of the building 602. The first and second UEs 610, 612 can each be located on other floors of the building, and/or one or more other UEs can be located in the building 602 that may be attempting to communicate with one or more of the communication nodes 606, 608 similar to that discussed herein regarding the first and second UEs 610, 612. Additionally, as mentioned above, a UE can be located in another extreme channel condition, e.g., in an underground location that is not inside of a building, such as deep underground in a mine or other underground location, at a location far away from the one or more of the communication nodes 606, 608, an environment where a high number of UEs are simultaneously accessing (or attempting to access) the network, etc. Such extreme channel conditions may impose difficulties in a base station, such as the communication nodes 606, 608, detecting signals.

Figure 7:
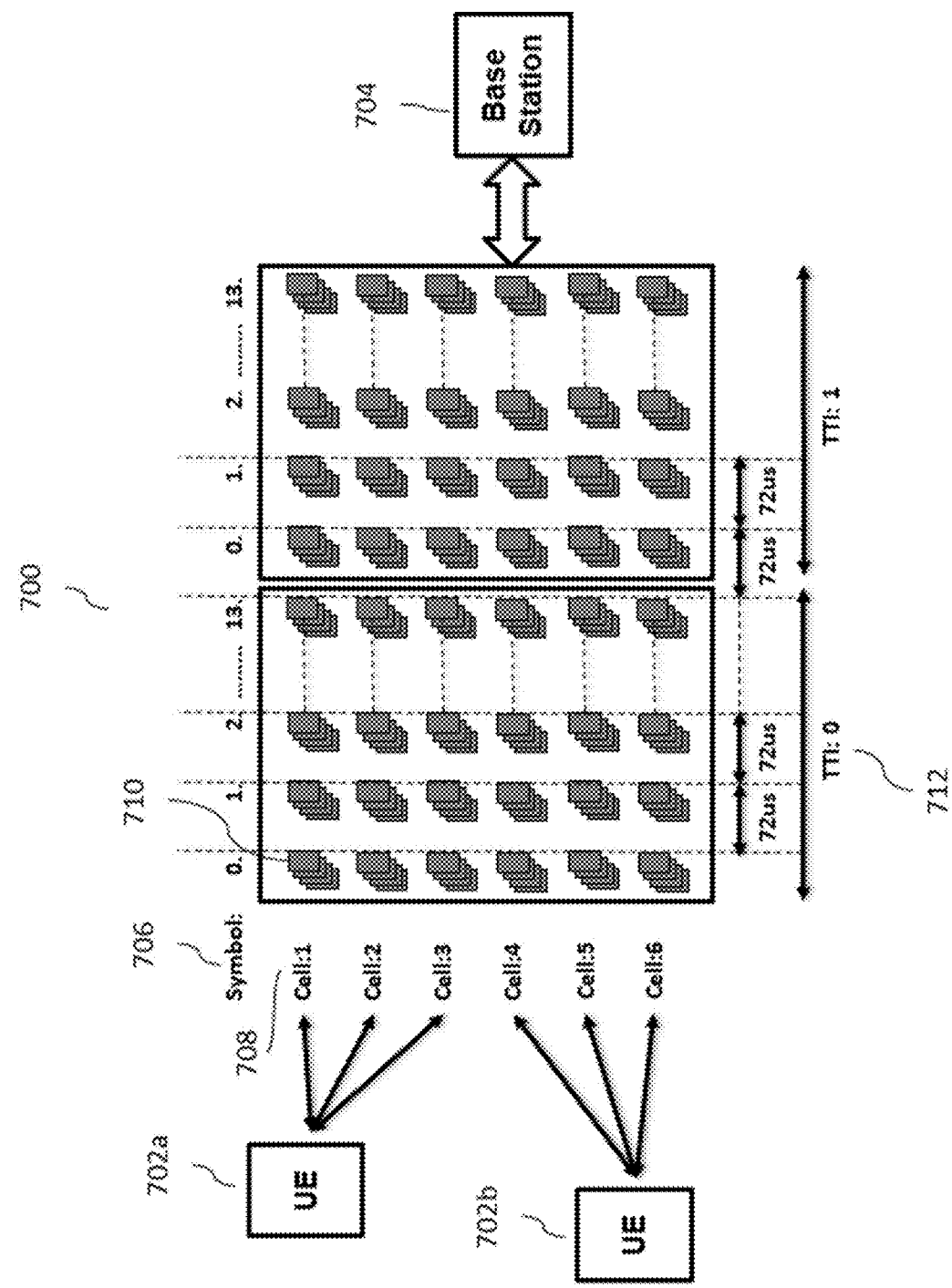
FIG. 7 illustrates another exemplary system for enhancing detection in wireless communication systems, according to some implementations of the current subject matter.

In some implementations, the current subject matter can be configured to perform enhancement of detection of signals in wireless communications systems, such as LTE, 5G NR, and/or any other wireless communications environments. FIG. 7 illustrates an exemplary system 700 for performing enhancement of detection of signals in wireless communications systems, according to some implementations of the current subject matter. The system 700 can be incorporated in one or more systems described above in connection with FIGS. 1*a*-6.

The system 700 can include one or more user equipments 702*a*, 702*b* and one or more base stations 704. As shown, for example, in FIG. 7, a single base station 704 can be configured to interface with two UEs 702*a*, 702*b*. Another number of UEs may be in the system 700, e.g., one, three, four, five, etc., and another number of base stations may be in the system 700, e.g., two, three, four, five, etc.

In some implementations, communication between the base station 704 and the UEs 702a, 702b can include transmitting/receiving one or more data symbols 706 per antenna-carrier (AxC) for each cell 708. In the system 700 shown in FIG. 7, there are six cells 708 each with four transceivers and corresponding to the twenty four AxC antennas. For each transmission in each cell with a 1 milli-second subframe structure, there can be 14 symbol packets 710 that can define a frame and can be transmitted within each time transmission interval (TTI) 712. In each TTI 712, symbol packets 710 can be spaced 72 microseconds apart. The base station 704 can be configured to perform enhancement of detection of signals to help detect the signals, e.g., to help detect a frame having a plurality of symbols.

In some implementations, the current subject matter can provide a mechanism to detect signals to help ensure that the base station (e.g., one or more base stations 106 of FIGS. 1b-2, base station 301 of FIG. 3, base station 704 of FIG. 7, etc.) detects signals from the UE (e.g., one or more UEs 104 of FIGS. 1b and 1c, one or more UEs 610,612 of FIG. 6, one or more UEs 702a, 702b of FIG. 7, etc.) for uplink. The mechanism can be implemented in the base station, for example, as part of its software layers, and can provide a way to help detect symbol packets 710.

Figure 8:
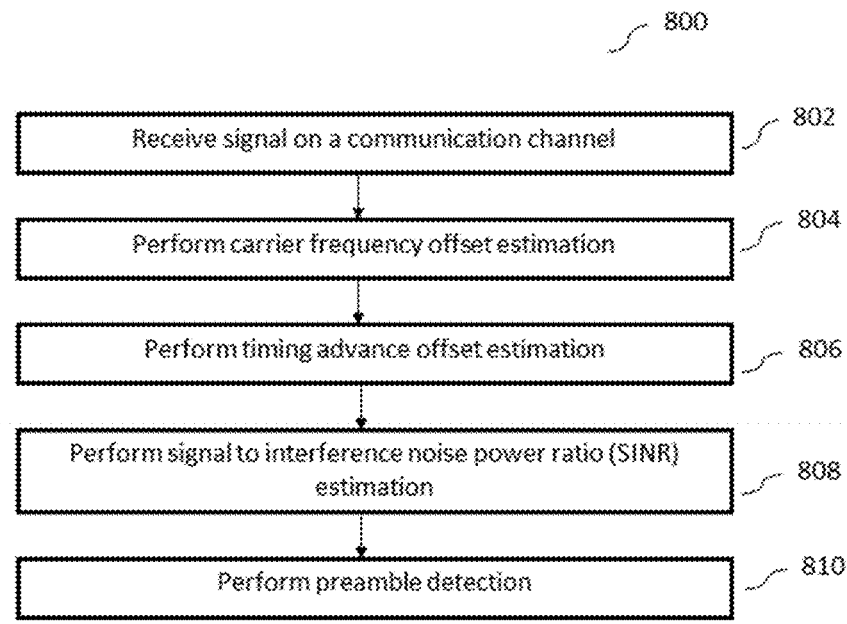
FIG. 8 illustrates an exemplary process for enhancing detection in wireless communication systems, according to some implementations of the current subject matter.

FIG. 8 illustrates an exemplary process 800 for performing enhancement of detection of signals in a wireless communication system, according to some implementations of the current subject matter. The process 800 may be executed by a base station and/or one or more of its components that may incorporate one or more components of a system, such as the system 600 of FIG. 6 or the system 700 of FIG. 7. For example, the process 800 may be executed by one or more base stations (e.g., one or more base stations 106 of FIGS. 1b-2, base station 301 of FIG. 3, base station 704 of FIG. 7, etc. etc.) with respect to user equipment (e.g., one or more UEs 104 of FIGS. 1b and 1c, one or more UEs 610, 612 of FIG. 6, one or more UEs 702a, 702b of FIG. 7, etc.) and may be performed in connection with physical/data channels.

As shown in FIG. 8, the process 800 can include the base station receiving 802, e.g., with one or more antennas such as the antenna(s) 136 of FIG. 1d, a signal on a communication channel, e.g., an uplink communication channel established between the base station and one or more UEs. The interface can be, for example, the air interface 122 of FIG. 1 using OFDMA and SC-FDMA, or can be another communication channel. The signal can contain a frame including a plurality of symbols that include one or more symbol groups. In general, an OFDM symbol can include a random access preamble including a cyclic prefix (CP) portion and a data symbol. A symbol group can include a CP portion and a plurality of data symbols, which may reduce overhead by allowing one CP portion to be used with multiple data symbols instead of using one CP portion with only one data symbol. Random access is based on the UE transmitting the random access preamble on a random access channel (RACH) for access to the base station, either as initial access to the network including the base station or as a handoff from one base station to another. The process 800 is discussed with respect to a UE transmitting the signal to a base station, but another transmitter may transmit the signal to the base station, such as another base station (e.g., in a handoff situation).

The process 800 can also include, after the receipt 802 of the signal, the base station performing 804 carrier frequency offset estimation. In general, carrier frequency offset estimation may allow for carrier frequencies to be corrected for offset before performing 804 timing advance offset estimation and thus improve accuracy of the timing advance offset estimation. As will be appreciated, timing advance offset estimation can be performed 804 in a variety of ways, such as in accordance with 3GPP Technical Standard (TS) 36.211 (Evolved Universal Terrestrial Radio Access (E-UTRA); Physical channels and modulation). In general, timing advance (TA) offset estimation controls the uplink transmission timing of the UE.

OFDM uses a plurality of subcarrier (SC) frequencies for signal communication, with each of the subcarriers being orthogonal to one another, e.g., to eliminate crosstalk of signals. However, subcarrier spacing may be close enough to cause inter-carrier interference if one or more of the signals shift enough in frequency, which may affect the base station's ability to properly receive and process signals and thus may affect detection of the UE. Such carrier frequency offset (CFO) may be caused, for example, by an oscillator mismatch between the transmitter (e.g., the UE) and the receiver (e.g., the base station), Doppler shift as the transmitter and/or the receiver is moving, etc. Each symbol group can be transmitted at a different subcarrier frequency. Transmission of the symbol groups may therefore interfere with one another due to CFO.

In performing 804 carrier frequency offset estimation, one or more correlation metrics can be determined from each of the symbol groups. The determined one or more correlation metrics can be combined, e.g., accumulated or averaged, across all of the symbol groups, which may suppress noisy estimate. One or more carrier frequency offsets can then be generated based on the determined correlation metrics. For example, one or more angles associated with the determined one or more correlation metrics can be determined, and the one or more carrier frequency offsets can be generated based on the determined one or more angles associated with the determined one or more correlation metrics.

In some implementations, the received 802 signal can include one or more narrow band internet of things (NB-IoT) physical random access channel (NPRACH) signals. In other implementations, the received 802 signal does not include any NPRACH signals. Depending on the timing of when signals are transmitted by the UE, the signal may or may not include an NPRACH signal. Regardless of whether or not the signal includes one or more NPRACH signals, the carrier frequency offset estimation can be performed 804.

In some implementations, carrier frequency offset estimation can be performed 804 on all symbols in a symbol group. In other implementations, carrier frequency offset estimation can be performed 804 on only a subset of symbols in a symbol group or on only a subset of the symbol groups.

The process 800 can also include, after performing 804 the timing advance offset estimation, performing 808 signal to noise interference power ratio (SINR) estimation. In general, performing 808 SINR estimation before performing 810 preamble detection may improve detection accuracy since noise can be accounted for before preambles are detected. As will be appreciated, preamble detection can be performed 810 in a variety of ways, such as in accordance with 3GPP Technical Standard (TS) 36.211 (Evolved Universal Terrestrial Radio Access (E-UTRA); Physical channels and modulation). In general, preamble detection allows identification of a start of a symbol group by identifying a random access preamble transmitted by the UE.

In general, SINR is power of the signal divided by the sum of interference power from all other signals, e.g., signals on other SC frequencies, in the network and noise. SINR allows for measurement of quality of the wireless connection. Few subcarrier frequencies are dynamically reserved for noise and interference measurements. The SINR estimation can include the base station determining SINR associated with the received 802 signal using a signal power determined based on subcarrier resource allocation and noise power determined based on one or more reserved subcarrier allocation associated with the received 802 signal. The signal power can be determined, for example, based on a correlation of subcarrier resource allocations associated with one or more adjacent symbol groups and one or more non-adjacent symbol groups in the one or more symbol groups. The noise power can be determined, for example, based on the one or more reserved subcarrier allocation associated with and/or adjacent to a NB-IoT region of the received 802 signal. The SINR determination can be repeated in accordance with the received 802 signal. The detection threshold may be changed with a number of repetitions being used to adjust for performance difference between different configurations of repetitions. One or more preambles associated with the one or more symbols groups can be detected in the repeating, or no preambles associated with the one or more symbols groups can be detected in the repeating.

The following equation can be used, e.g., by a processor, in performing 808 the SINR estimation. In the equation s represents symbol group index, ns represents interval between symbol groups, n_RA_sc(s) represent subcarrier index generated from hopping sequence for symbol group s, and $NPRACH_{rep}$ represents number of NPRACH repetitions.

$$\text{Correlation Power} = \frac{\sum_{rx} \left| \frac{\sum_{s,k \in n\_RA\_sc(s)} \tilde{Y}_{k,s}^{rx} (\tilde{Y}_{k,s+ns}^{rx})^*}{(4NPRACH_{rep} - 1)} \right|}{N_{rx}}$$

As mentioned above, in some implementations, the received 802 signal can include one or more NPRACH signals. In other implementations, the received 802 signal does not include any NPRACH signals. Depending on the timing of when signals are transmitted by the UE, the signal may or may not include an NPRACH signal. Regardless of whether or not the signal includes one or more NPRACH signals, the SINR estimation can be performed 808.

In some implementations, the SINR estimation can use any unallocated SC outside the NB-IoT band.

In some implementations, the carrier frequency offset estimation and the SINR estimation are each performed 804, 808, as shown in FIG. 8. In other implementations, the carrier frequency offset estimation is performed 804 and the SINR estimation is not performed 808. In still other implementations, the carrier frequency offset estimation is not performed 804 and the SINR estimation is performed 808. Performing 804, 808 each of the carrier frequency offset estimation and the SINR estimation may improve signal detection more than if only one of carrier frequency offset estimation and SINR estimation is performed. Performing 804, 808 each of the carrier frequency offset estimation and the SINR estimation may require more processing resources and/or take more time to achieve signal detection than if only one of carrier frequency offset estimation and SINR estimation is performed. Additionally, it may be simpler and/or more cost effective to upgrade an existing system by providing in the upgrade capability to only perform one of the carrier frequency offset estimation and the SINR estimation.

Figure 9:
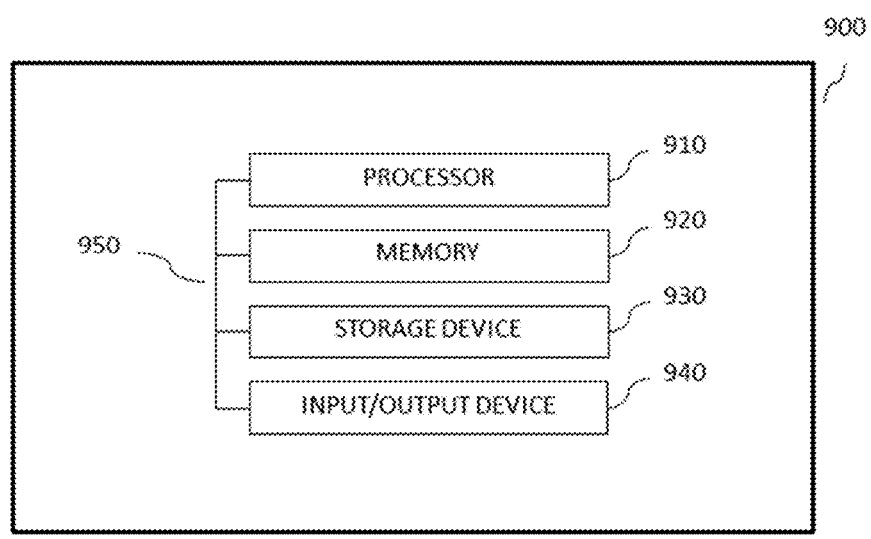
FIG. 9 illustrates an exemplary system, according to some implementations of the current subject matter.

In some implementations, the current subject matter can be configured to be implemented in a system 900, as shown in FIG. 9. The system 900 can include one or more of a processor 910, a memory 920, a storage device 930, and an input/output device 940. Each of the components 910, 920, 930, 940 can be interconnected using a system bus 950. The processor 910 can be configured to process instructions for execution within the system 900. In some implementations, the processor 910 can be a single-threaded processor. In alternate implementations, the processor 910 can be a multi-threaded processor. The processor 910 can be further configured to process instructions stored in the memory 920 or on the storage device 930, including receiving or sending information through the input/output device 940. The memory 920 can store information within the system 900. In some implementations, the memory 920 can be a computer-readable medium. In alternate implementations, the memory 920 can be a volatile memory unit. In yet some implementations, the memory 920 can be a non-volatile memory unit. The storage device 930 can be capable of providing mass storage for the system 900. In some implementations, the storage device 930 can be a computer-readable medium. In alternate implementations, the storage device 930 can be a floppy disk device, a hard disk device, an optical disk device, a tape device, non-volatile solid state memory, or any other type of storage device. The input/output device 940 can be configured to provide input/output operations for the system 900. In some implementations, the input/output device 940 can include a keyboard and/or pointing device. In alternate implementations, the input/output device 940 can include a display unit for displaying graphical user interfaces.

Figure 10:
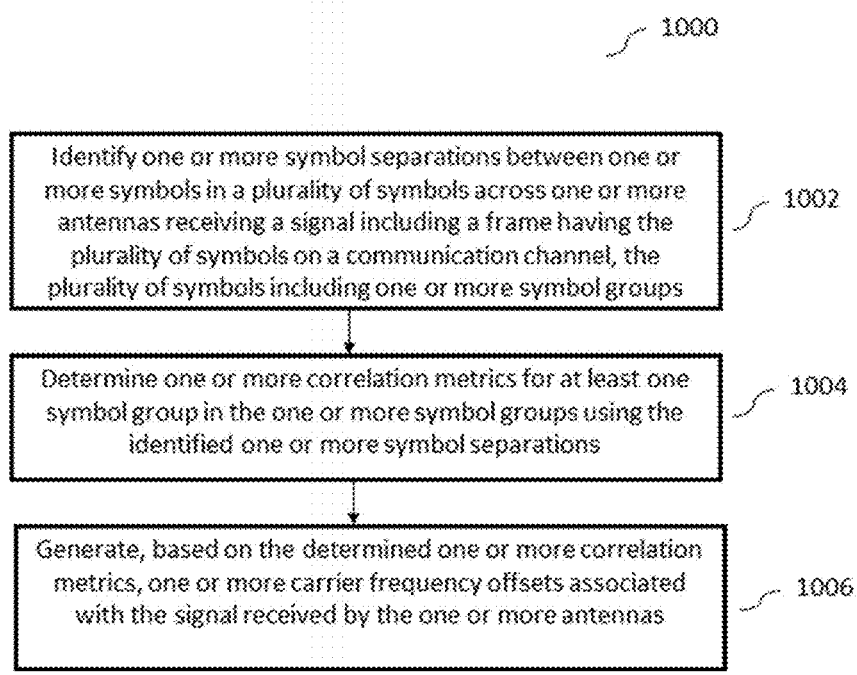
FIG. 10 illustrates an exemplary method, according to some implementations of the current subject matter.

FIG. 10 illustrates an exemplary method 1000 for enhancing detection in wireless communication systems, according to some implementations of the current subject matter. The method 1000 illustrates one implementation of performing carrier frequency offset estimation. In the method 1000, one or more symbol separations between one or more symbols in a plurality of symbols can be identified 1002, e.g., using at least one processor of a base station, across one or more antennas receiving a signal including a frame having the plurality of symbols on a communication channel. The plurality of symbols can include one or more symbol groups. One or more correlation metrics can be determined 1004, e.g., using at least one processor of a base station, for at least one symbol group in the one or more symbol groups using the identified one or more symbol separations. Based on the determined one or more correlation metrics, one or more carrier frequency offsets associated with the signal received by the one or more antennas can be generated 1006, e.g., using at least one processor of a base station.

In some implementations, the current subject matter can include one or more of the following optional features. In some implementations, one or more timing advance offsets associated with the signal received by the one or more antennas can be generated based on the generated one or more carrier frequency offsets.

In some implementations, the signal can include one or more narrow band internet of things ("NB-IoT") physical random access channel signals received from one or more user equipments. Further, in some implementations, the determining of the one or more correlation metrics can be repeated in accordance with the received one or more NB-IoT physical random access channel ("NPRACH") signals. Yet further, in some implementations, the repeating can be performed using a predetermined number of NPRACH repetitions.

In some implementations, the signal can not include any NB-IoT physical random access channel signals.

In some implementations, the generating one or more carrier frequency offsets can include determining one or more angles associated with the determined one or more correlation metrics, and generating the one or more carrier frequency offsets based on the determined one or more angles associated with the determined one or more correlation metrics.

In some implementations, the determining can include combining the one or more correlation metrics for one or more symbol separations.

In some implementations, at least one of the identifying, the determining, and the generating can be performed by a base station having at least one processor communicatively coupled to at least one memory, and the base station can further include a radio transmitter and a radio receiver. Further, in some implementations, the base station can include at least one of the following: an eNodeB base station, a gNodeB base station, and any combination thereof, and/or the communication channel can include an uplink communication channel. Yet further, in some implementations, the uplink communication channel can be established with the base station, or the uplink communication channel can be established between the base station and at least one user equipment.

Figure 11:
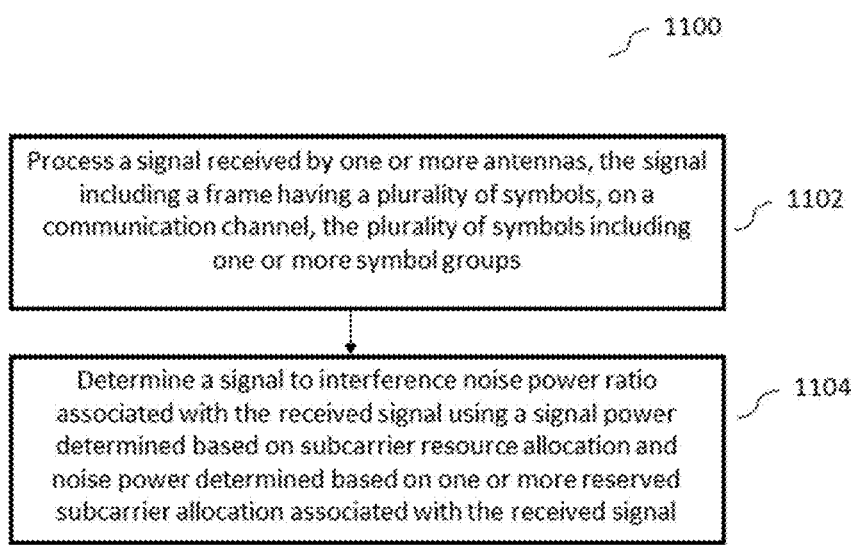
FIG. 11 illustrates another exemplary method, according to some implementations of the current subject matter.

FIG. 11 illustrates an exemplary method 1100 for enhancing detection in wireless communication systems, according to some implementations of the current subject matter. The method 1100 illustrates one implementation of performing SINR estimation. In the method 1100, a signal received by one or more antennas on a communication channel can be processed 1102, e.g., using at least one processor of a base station. The signal can include a frame having a plurality of symbols, and the plurality of symbols can include one or more symbol groups. A signal to interference noise power ratio (SINR) associated with the received signal can be determined 1104, e.g., using at least one processor of a base station, using a signal power determined based on subcarrier resource allocation and noise power determined based on one or more reserved subcarrier allocation associated with the received signal.

In some implementations, the current subject matter can include one or more of the following optional features. In some implementations, determining of the signal power can be based on a correlation of subcarrier resource allocations associated with one or more adjacent symbol groups and one or more non-adjacent symbol groups in the one or more symbol groups.

In some implementations, the noise power can be determined based on the one or more reserved subcarrier allocation associated with a narrow band internet of things ("NB-IoT") region of the received signal.

In some implementations, the noise power can be determined based on the one or more reserved subcarrier allocation being adjacent to a NB-IoT region of the received signal.

In some implementations, the determining can be based on at least one of a carrier frequency offset and a timing advance offset associated with the received signal.

In some implementations, the signal can include one or more NB-IoT physical random access channel ("NPRACH") signals. Further, in some implementations, the determining of the signal to interference noise power ratio can be repeated in accordance with the received one or more NPRACH signals. Yet further, in some implementations, one or more preambles associated with the received signal can be detected in accordance with the repeating. Still further, in some implementations, one or more preambles can be detected in accordance with one or more hopping sequences associated with the one or more symbol groups, and/or the detecting can be based on a comparison of the determined signal to interference noise power ratio to one or more signal to interference noise power ratio thresholds.

In some implementations, the signal can not include any NPRACH signals. Further, in some implementations, the determining of the signal to interference noise power ratio can be repeated in accordance with the received signal without any NPRACH signals. Yet further, in some implementations, no preambles associated with the received signal can be detected based on the repeating.

In some implementations, the signal can be received from at least one of the following: a user equipment, a base station, and any combination thereof.

In some implementations, at least one of the processing, and the determining can be performed by a base station having at least one processor communicatively coupled to at least one memory, and the base station can further include a radio transmitter and a radio receiver. Yet further, in some implementations, the base station cam include at least one of the following: an eNodeB base station, a gNodeB base station, and any combination thereof. Still further, in some implementations, the communication channel can include an uplink communication channel. Even further, in some implementations, the uplink communication channel can be established with the base station, or the uplink communication channel can be established between the base station and at least one user equipment.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices ("PLDs"), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube ("CRT") or a liquid crystal display ("LCD") monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
processing, using at least one processor, a signal received by one or more antennas, the signal including a frame having a plurality of symbols, on a communication channel, the plurality of symbols including one or more symbol groups; and
determining, using the at least one processor, a signal to interference noise power ratio associated with the received signal using a signal power determined based on subcarrier resource allocation and noise power determined based on one or more reserved subcarrier allocation associated with the received signal.

2. The method according to claim 1, wherein determining of the signal power is based on a correlation of subcarrier resource allocations associated with one or more adjacent symbol groups and one or more non-adjacent symbol groups in the one or more symbol groups.

3. The method according to claim 1, wherein the noise power is determined based on the one or more reserved subcarrier allocation associated with a narrowband internet of things (NB-IoT) region of the received signal.

4. The method according to claim 1, wherein the noise power is determined based on the one or more reserved subcarrier allocation being adjacent to a narrowband internet of things (NB-IoT) region of the received signal.

5. The method according to claim 1, wherein the determining is based on at least one of a carrier frequency offset and a timing advance offset associated with the received signal.

6. The method according to claim 1, wherein the signal includes one or more narrowband internet of things (NB-IoT) physical random access channel (NPRACH) signals.

7. The method according to claim 6, further comprising repeating the determining of the signal to interference noise power ratio in accordance with the received one or more NPRACH signals.

8. The method according to claim 7, further comprising detecting one or more preambles associated with the received signal in accordance with the repeating.

9. The method according to claim 8, wherein the one or more preambles are detected in accordance with one or more hopping sequences associated with the one or more symbol groups.

10. The method according to claim 8, wherein the detecting is based on a comparison of the determined signal to interference noise power ratio to one or more signal to interference noise power ratio thresholds.

11. The method according to claim 1, wherein the signal does not include any narrowband internet of things (NB-IoT) physical random access channel (NPRACH) signals.

12. The method according to claim 11, further comprising repeating the determining of the signal to interference noise power ratio in accordance with the received signal without any NPRACH signals.

13. The method according to claim 12, wherein no preambles associated with the received signal are detected based on the repeating.

14. The method according to claim 1, wherein the signal is received from at least one of the following: a user equipment, a base station, and any combination thereof.

15. The method according to claim 1, wherein at least one of the processing, and the determining is performed by a base station having at least one processor communicatively coupled to at least one memory, the base station further including a radio transmitter and a radio receiver.

16. The method according to claim 15, wherein the base station includes at least one of the following: an eNodeB base station, a gNodeB base station, and any combination thereof.

17. The method according to claim 16, wherein the communication channel includes an uplink communication channel.

18. The method according to claim 17, wherein the uplink communication channel is established with the base station.

19. An apparatus, comprising:
at least one processor; and
at least one non-transitory storage media storing instructions that, when executed by the at least one processor, cause the at least one processor to perform operations comprising:
processing a signal received by one or more antennas, the signal including a frame having a plurality of symbols, on a communication channel, the plurality of symbols including one or more symbol groups; and
determining a signal to interference noise power ratio associated with the received signal using a signal power determined based on subcarrier resource allocation and noise power determined based on one or more reserved subcarrier allocation associated with the received signal.

20. At least one non-transitory storage media storing instructions that, when executed by at least one processor, cause the at least one processor to perform operations comprising:
processing a signal received by one or more antennas, the signal including a frame having a plurality of symbols, on a communication channel, the plurality of symbols including one or more symbol groups; and
determining a signal to interference noise power ratio associated with the received signal using a signal power determined based on subcarrier resource allocation and noise power determined based on one or more reserved subcarrier allocation associated with the received signal.

* * * * *